L. L. TYLER.
CAR BRAKE.
APPLICATION FILED JULY 1, 1911.

1,020,936.

Patented Mar. 19, 1912.

WITNESSES
Samuel E. Wade.
Perry B. Turpin

INVENTOR
LEWIS L. TYLER,
BY
ATTORNEYS

UNITED STATES PATENT OFFICE.

LEWIS L. TYLER, OF TACOMA, WASHINGTON.

CAR-BRAKE.

1,020,936.  Specification of Letters Patent.  Patented Mar. 19, 1912.

Application filed July 1, 1911. Serial No. 636,358.

*To all whom it may concern:*

Be it known that I, LEWIS L. TYLER, a citizen of the United States, and a resident of Tacoma, in the county of Pierce and State of Washington, have invented certain new and useful Improvements in Car-Brakes, of which the following is a specification.

This invention is an improvement in car brakes, and particularly in brakes of that class illustrated by the patent to Warner, No. 781,578, of January 31, 1905, in which the brake staff is journaled in a support pivotally mounted so that the staff can be adjusted to either a vertical or horizontal position to enable the operation of the brake from the top of the car or from alongside the car as may be desired.

The present invention has for an object to provide improvements in said construction and consists is certain novel constructions and combinations of parts as will be hereinafter described and claimed.

Figure 1:
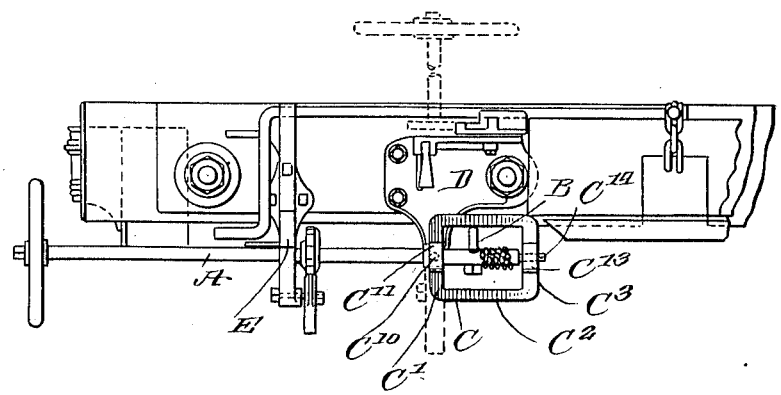
Figure 2:
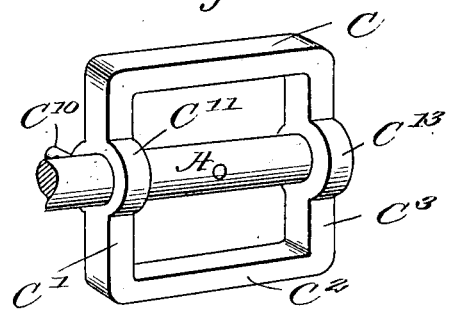
Figure 3:
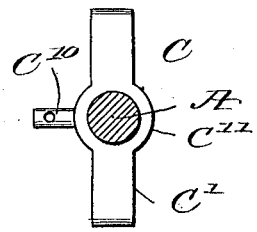

In the drawing Figure 1 is a front view of my invention as in use. Fig. 2 is a perspective view of the carrier, the brake staff being in place. Fig. 3 is an end view of the carrier, the staff being shown in section.

As shown, the brake staff A which may be connected at B in any suitable way with the chain leading to the brakes, is journaled in a carrier C which carrier is in the form of an open frame having an upper cross bar $C'$, side bars $C^2$ and a bottom bar $C^3$, the bars $C'$ and $C^3$ being provided with bearings $C^{11}$ and $C^{13}$ in which is journaled the brake staff A, the staff extending entirely across the opening of the frame between the top bar $C'$ and the bottom bar $C^3$ and being journaled in both of its bars $C'$ and $C^3$ so that the brake lever is journaled on opposite sides of the point B, where it connects with the brake chain which it operates. At its upper end, the carrier C is pivoted at $C^{10}$ to the car, preferably by means of a bracket D and a pin $C^{10}$ projecting from the carrier C and entering a suitable bearing in the bracket D so that the carrier C may rock between the horizontal position shown in Fig. 1 and a vertical position on the point $C^{10}$. The brake staff projects below the carrier and has an opening $C^{14}$ in which a cotter pin or other suitable fastening may be applied and when the brake staff is turned to the horizontal position shown in Fig. 1, it is supported by a bracket E on the car frame as best shown in Fig. 1.

By extending the brake staff entirely across the open frame, I am able to support the said staff at its extreme lower end and also to support it on opposite sides of the point, where the chain connects and an important feature of the open frame construction of the carrier is that thereby the brake chain is prevented from dropping under the brake staff E and is held at all times in proper relation to the brake staff to permit the operation of the chain by the turning of the said staff in the usual manner.

I claim:

1. The combination of a brake staff, a carrier therefor pivoted at its upper end and made in the form of an open frame having a top bar, a bottom bar and side bars, the brake staff extending between the top bar and bottom bar and entirely across the opening in the frame and projecting through the bottom bar to a point beyond the same, substantially as set forth.

2. The combination of a brake staff and a carrier therefor pivoted at its upper end and made in the form of an open frame with the brake staff extending entirely across the opening in the frame, substantially as set forth.

LEWIS L. TYLER.

Witnesses:
 CANALISE SMITH,
 GUY E. KELLY.

Copies of this patent may be obtained for five cents each, by addressing the "Commissioner of Patents, Washington, D. C."